(12) United States Patent
Kodaira et al.

(10) Patent No.: US 7,641,256 B2
(45) Date of Patent: Jan. 5, 2010

(54) TONNEAU COVER DEVICE

(75) Inventors: Masanori Kodaira, Hiroshima (JP); Tomohiro Hori, Hiroshima (JP); Yuzou Sato, Hiroshima (JP)

(73) Assignee: Mazda Motor Corporation (JP)

( * ) Notice: Subject to any disclaimer, the term of this patent is extended or adjusted under 35 U.S.C. 154(b) by 391 days.

(21) Appl. No.: 11/636,664

(22) Filed: Dec. 11, 2006

(65) Prior Publication Data
US 2007/0176460 A1   Aug. 2, 2007

(30) Foreign Application Priority Data

Jan. 30, 2006   (JP)   ............... 2006-020232
Apr. 18, 2006   (JP)   ............... 2006-114091

(51) Int. Cl.
*B60R 7/04* (2006.01)
(52) U.S. Cl. .................... 296/37.16; 296/37.1
(58) Field of Classification Search ............ 296/37.1, 296/37.16, 24.33, 100.02, 100.03, 100.4, 296/100.15, 100.04
See application file for complete search history.

(56) References Cited

U.S. PATENT DOCUMENTS

| 3,181,911 | A  | 5/1965  | Peras    |
| 2004/0232720 | A1 | 11/2004 | Schlecht |

2007/0120391 A1 * 5/2007 Hori et al. ............... 296/100.15

FOREIGN PATENT DOCUMENTS

| EP | 1 479 564 A2 | 11/2004 |
| GB | 2 040 833 A  | 9/1980  |
| JP | 57 126719 A  | 8/1982  |
| JP | 57126719     | 8/1982  |
| JP | 2002-248993 A | 9/2002 |
| WO | 98/24657     | 6/1998  |

OTHER PUBLICATIONS

European Search Report dated Mar. 6, 2007 Application No. EP 07 00 0900.

* cited by examiner

*Primary Examiner*—Lori L Lyjak
(74) *Attorney, Agent, or Firm*—Studebaker & Brackett PC; Donald R. Studebaker

(57) ABSTRACT

A tonneau cover device comprises a tonneau cover and guide rails. A front end of the tonneau cover is pivotally supported at the vehicle. The tonneau cover comprises plural board members provided in a longitudinal direction and jointly connected to each other. The board member is supported by the guide rails to move vertically. A change of a longitudinal distance between a support pin portion of the board member at the guide rail and a pivot axis portion of the board member when the board member moves upward along the guide rails is absorbed by the joint connections of the tonneau cover. Accordingly, the tonneau cover can be opened widely and the tonneau cover can allow even large baggage to be carried in or out of the baggage compartment smoothly.

17 Claims, 9 Drawing Sheets

TONNEAU COVER DEVICE

BACKGROUND OF THE INVENTION

The present invention relates to a tonneau cover device, and particularly to the one in which a tonneau cover can be widely opened by utilizing bending of the tonneau cover.

In a conventional tonneau cover, a tonneau cover is configured so that it is opened or closed according to an open-close operation of a back door, and when the back door is opened, the tonneau cover moves to its upper position for allowing any baggage to be carried in or out of a baggage compartment.

U.S. Pat. No. 3,181,911 discloses a structure in which two panel pieces are provided behind a seat back so as to cover over a baggage compartment, a rear-side panel piece comprises a pair of arm members at its both-side end portions, and rear end portions of these arm members are connected to a back door, whereby the rear-side panel piece can be opened or closed according to the open-close operation of the back door.

In the structure disclosed in the above patent publication, when the back door is opened, a rear end of the rear-side panel piece is pulled up by the arm members and thereby the baggage compartment is opened for the baggage carrying in or out. Meanwhile, when the back door is closed, the rear-side panel piece is lowered and thereby the baggage compartment is closed.

The above-described structure has a problem, however, in that since only the rear-side panel piece is opened according to the back door opening, an opened space over the baggage compartment would not be large enough to carry in or out a relatively large baggage from the baggage compartment smoothly. Also, since the front-side panel piece is fixed to a vehicle body, thereby not opened, the carrying in or out of the baggage to or from a forward space in the compartment, which is below the front-side panel piece, may be too difficult to load lots of baggage.

SUMMARY OF THE INVENTION

The present invention has been devised in view of the above-described problem, and an object of the present invention is to provide a tonneau cover device that can open a tonneau cover widely so as to allow even large baggage to be carried in or out of a baggage compartment smoothly.

According to the present invention, there is provided a tonneau cover device, comprising a tonneau cover provided behind a seat back of a vehicle, the tonneau cover being configured to cover over a baggage compartment formed before a rear opening that is opened and closed by a back door that is operated vertically, and a pair of guide rails provided at both-side rear pillars of the vehicle that is located before the rear opening, the guide rails being configured to support both-side rear ends of the tonneau cover movably in substantially an obliquely direction along the rear pillars, wherein a front end portion of the tonneau cover is pivotally supported at the vehicle, the tonneau cover comprises a plurality of board members that are provided in a longitudinal direction of the vehicle and jointly connected to each other, a rear board member of the tonneau cover is supported by the guide rails so as to move substantially vertically along the guide rails, and a change of a longitudinal distance between a support point of the rear board member at the guide rail and a pivot axis portion of the front end of the tonneau cover at the vehicle when the rear board member moves upward along the guide rails is configured to be absorbed by the joint connection of the board members.

Herein, the rear board member and the back door may be connected via a belt-shaped member or the like, or the rear board member may be configured to move vertically according to the open-close operation of the back door. Also, the board member may be configured to move vertically by an electric board member open-close mechanism.

When the tonneau cover moves upward (is opened), the rear portion of the tonneau cover (rear board member) moves upward along the guide rails, and the tonneau cover is bent at each joint connection. Thereby, the change of the longitudinal distance between the support point of the rear board member at the guide rail and the pivot axis portion of the front end of the tonneau cover at the vehicle can be absorbed. Accordingly, the rear board member moves upward above the baggage compartment and thus the tonneau cover can be opened widely. Thereby, the tonneau cover can allow even large baggage or the like to be carried in or out of the baggage compartment of the vehicle smoothly.

According to an embodiment of the present invention, the tonneau cover comprises at least four board members, and the joint connections of the four board members are configured such that a center joint connection can only allow a reverse-V-shaped bending of the board members and front and rear joint connections can only allow a V-shaped bending of the board members. Accordingly, when the tonneau cover moves upward, two rear-side board members can move upward in a state where these two are not bent substantially, and thus the tonneau cover can be bent properly, having the V-shaped bending and the reverse-V-shaped bending, according to the upward movement of the rear board member.

According to another embodiment of the present invention, the rear board member of the tonneau cover is configured to be located substantially horizontally when the rear board member moves to an upper position thereof. Accordingly, a better appearance of the rear board member can be provided when the tonneau cover is opened (moves upward).

According to another embodiment of the present invention, the tonneau cover is configured to be detachable from the guide rails and foldable. Accordingly, the tonneau cover can be folded and stored properly when it is not used.

According to another embodiment of the present invention, the plural board members of the tonneau cover have substantially an identical longitudinal length, respectively. Accordingly, the tonneau cover can be stored compactly due to the substantially same length folded-board members.

According to another embodiment of the present invention, there is provided an association mechanism to move the rear board member of the tonneau cover vertically according to an open-close operation of the back door. Accordingly, the tonneau cover can be opened or closed (move vertically) automatically according to the open-close operation of the back door.

According to another embodiment of the present invention, there is provided an electric board member open-close mechanism that comprises a frame including the guide rails and an electric-operated mechanism operative to move said rear board member of the tonneau cover vertically. Accordingly, the tonneau cover can be opened or closed (move vertically) easily by switching operation of the electric board member open-close mechanism.

According to another embodiment of the present invention, both-side ends of the rear board member of the tonneau cover are supported movably at the guide rails via support members so that the rear board member moves upward along the guide rails, and the support members are configured so as to allow the rear board member to move longitudinally relative to the guide rails by a specified length. Herein, when the rear board member is simply moved upward along the guide rails from its lowered position, this upward movement of the rear board member might not occur smoothly at an initial stage. Namely, the rear board member may press forward the front-located board member due to its forward-and-upward displacement (this pressing condition happening to the both members would prevent the smooth movement of the board members). According to the above-described embodiment, however, since the rear board member is configured to be movable longitudinally relative to the guide rails, the rear board member is allowed to move back by receiving a reaction of the above-described pressing, so the pressing against the front-located board member can be suppressed properly and the smooth upward movement of the rear board member can be attained. Namely, at an initial stage, substantially only the upward movement of the rear board member is provided, and then after the rear board member has moved up to a certain degree to allow the V-shaped bending of the front-located portion and the rear board member, the rear board member moves upward along with the forward movement. Thus, the smooth and sure movement of the rear board member can be attained.

According to another embodiment of the present invention, the support member comprises a horizontal-maintaining portion operative to maintain the rear board member substantially horizontally, the rear board member comprises an engagement portion at each of the both-side ends thereof, and the engagement portion is engaged with the horizontal-maintaining portion so that the rear board member can be maintained substantially horizontally. Thereby, since the rear board member is maintained substantially horizontally even when it moves up to its upper position, the preferably large baggage space can be formed below the rear board member and a better appearance of the rear board member kept in its upper position can be provided.

According to another embodiment of the present invention, the engagement portion is provided at a tip end of a bar member that extends in a vehicle width direction between the both-side guide rails. Thereby, the rigidity of the engagement portion can be increased properly, and the rear board member can be stably and surely maintained substantially horizontally in the upper position.

According to another embodiment of the present invention, the engagement portion is engaged so as to be detachable from the horizontal-maintaining portion. Thereby, the tonneau cover can be detached and then stored properly.

According to another embodiment of the present invention, there is provided a linkage device that connects the rear board member to the back door so as to move the rear board member of the tonneau cover vertically according to an open-close operation of the back door, and the linkage device comprises a first guide portion provided at the vehicle near an upper end portion of the guide rail, a second guide portion provided at the vehicle in back of the first guide portion, and a belt-shaped connecting member connecting the support member and the back door, the connecting member being disposed so as to be guided by the first and second guide portion. Thereby, a layout space for the linkage mechanism can be made compact by applying the belt-shaped connecting member.

According to another embodiment of the present invention, the support member comprises a guide groove that extends substantially longitudinally and horizontally, an engagement portion provided at each of the both-side ends of the rear board member is disposed in the guide groove so as to move longitudinally in the guide groove, the rear board member is maintained substantially horizontally with the engagement portion being disposed in the guide groove, and a longitudinal relative position of the engagement portion in the guide groove when the rear board member is lowered is located before that of the engagement portion when the rear board member moves to an upper position thereof. Thereby, the above-described effect can be attained by a more specific structure. Particularly, since the guide groove is formed at the support member, there is no need for forming any guide groove at the rear board member that may be made of a relatively thin board.

According to another embodiment of the present invention, the guide groove has an open end at a front thereof, and the rear board member is configured to be detachable from the support member when the engagement portion goes out of the open end of the guide groove. Thereby, the detachable structure of the tonneau cover can be attained by a very simple structure of the guide groove with the open front end.

According to another embodiment of the present invention, the support member comprises a slider that is guided by the guide rail, the slider being fixed to the support member outward the guide groove so as not to rotate relative to the support member. Thereby, the support member having the portion to be guided by the guide rail and the portion to support the rear board member substantially horizontally can be made simply without increasing the number of components.

Other features, aspects, and advantages of the present invention will become apparent from the following description which refers to the accompanying drawings.

DETAILED DESCRIPTION OF THE INVENTION

Hereinafter, preferred embodiments of the present invention will be described referring to the accompanying drawings. The embodiments show some examples in which the present invention is applied to a tonneau cover device that covers a baggage in a baggage compartment provided behind a rear seat of an automotive vehicle, such as a hatchback, van or wagon types of vehicle.

Figure 1:
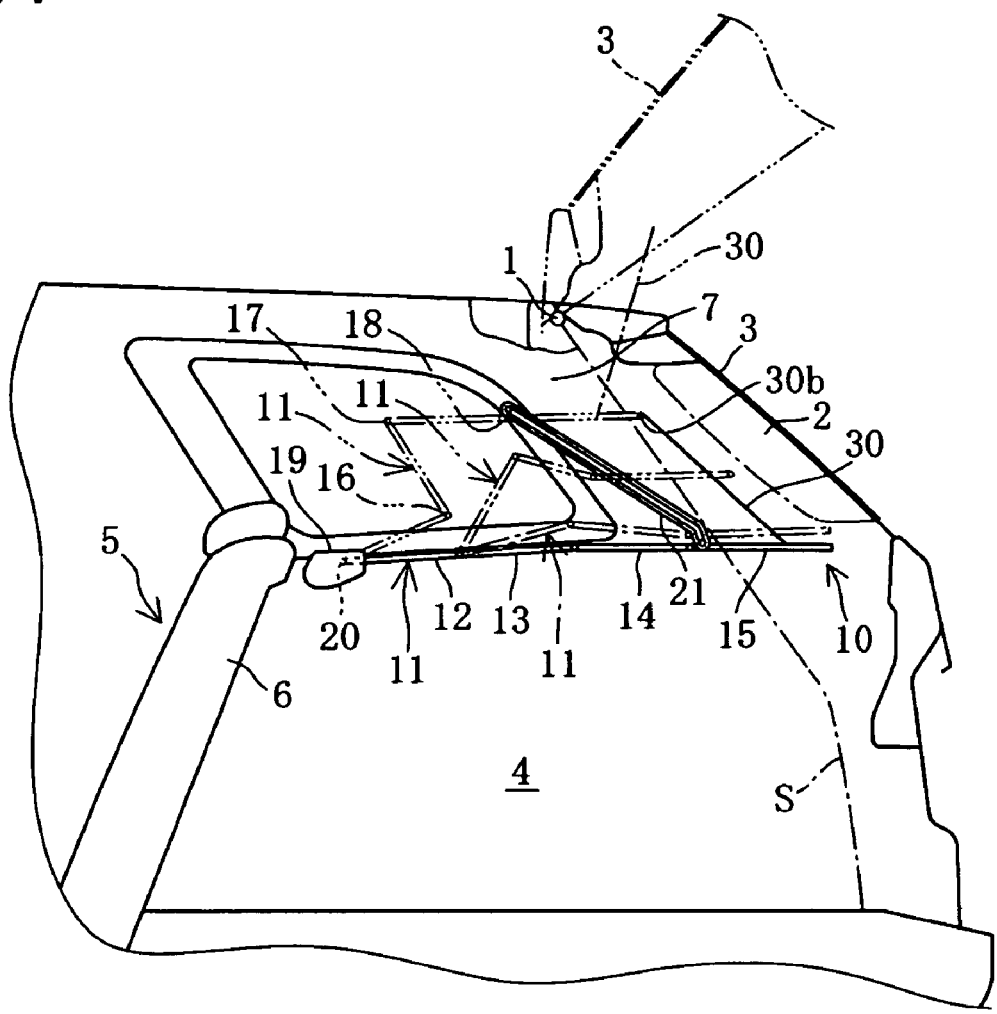
FIG. 1 is a side view of a vehicle rear portion of an automotive vehicle according to an embodiment of the present invention.
Figure 2:
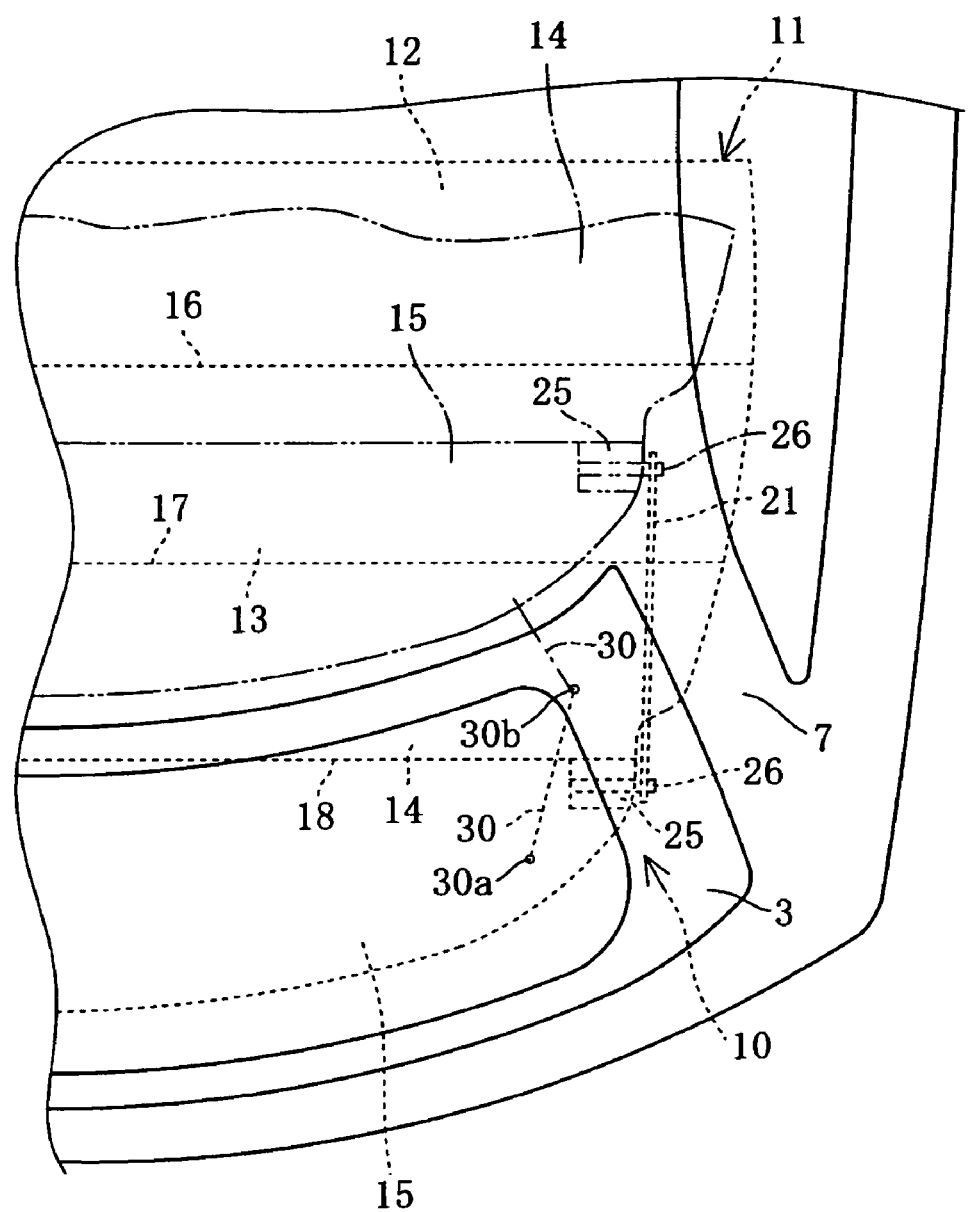
FIG. 2 is a plan view of the vehicle rear portion of the automotive vehicle.

As shown in FIGS. 1 and 2, at a rear portion of the automotive vehicle are provided a back door 3 that opens or closes a rear opening 2 by being operated vertically around a horizontal axis at a hinge portion 1, baggage compartment 4 that is provided before the rear opening 2, rear seat 5 that is provide before the baggage compartment 4, tonneau cover device 10 that is provided behind a seat back 6 of the rear seat 5, and so on. In FIG. 1, a reference character S denotes a line of a seal member that is provided along a periphery of the rear opening 2.

Hereinafter, the tonneau cover device 10 will be described referring to FIGS. 1 through 5. The tonneau cover device 10 comprises, as shown in FIGS. 1 and 2, a tonneau cover 11 that is provided behind the seat back 6 so as to cover an upper face of the baggage compartment 4, a pair of guide rails 21 that supports both-side ends of a rear portion of the tonneau cover 11 movably, a pair of belt members 30 (corresponding to an association mechanism) that associates a rear portion of the tonneau cover 11 with the back door, and so on. Although the guide rails 21 and the belt members 30 are provided at the both sides of the vehicle rear portion, but these disposed on the right side will be described hereinafter.

As shown in FIG. 1, a storage case 19 of the tonneau cover device 10 is provided behind and near an upper end of the seat back 6. A front end portion of the tonneau cover 11 is pivotally supported at a pivot axis portion 20 located in the storage case 19. The tonneau cover 11 comprises four board members 12 through 15 that are provided in a longitudinal direction of the vehicle and jointly connected to each other. These board members have an identical longitudinal length. These board members 12 through 15 are made of a synthetic-resin foam board (for example, about 4-8 mm thick) such as urethane foam, and each surface is covered by a flexible synthetic-resin skin 27.

Figure 4:
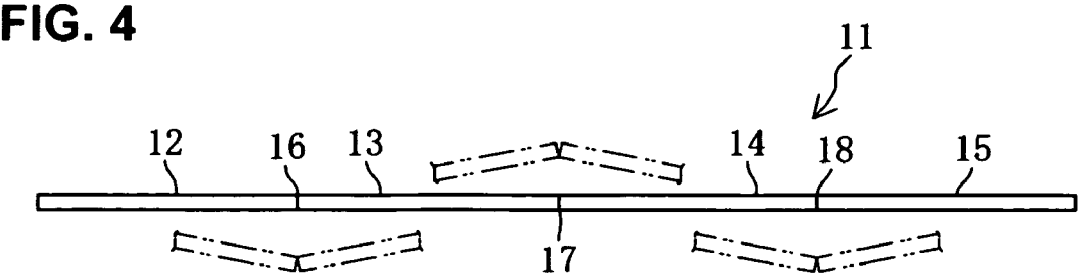
FIG. 4 is a side view of the tonneau cover.
Figure 5:
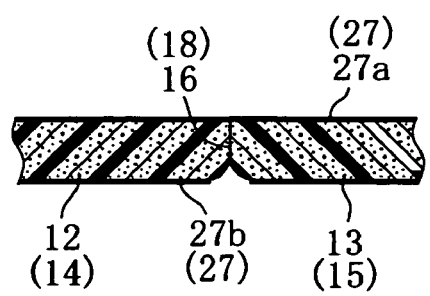
FIG. 5 is an enlarged longitudinal sectional view of a joint connection allowing a V-shaped bending of board members.

As shown in FIGS. 4 and 5, a joint connection 16 between the board members 12, 13 is configured so as to only allow a V-shaped bending of the board members. Namely, an upper skin 27a on the upper side is provided to extend continuously over the board members 12, 13, while a lower skin 27b on the lower side is cut out at the joint portion. And, both tip ends of the board members 12, 13 are located so as to contact each other in a state where they are not bent. Herein, a joint connection 18 between the board members 14, 15 has substantially the same structure as the above-described joint connection 16.

Figure 6:
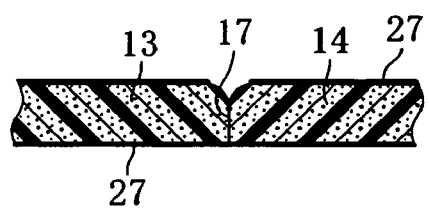
FIG. 6 is an enlarged longitudinal sectional view of a joint connection allowing a reverse-V-shaped bending of board members.

As shown in FIGS. 4 and 6, a joint connection 17 between the board members 13, 14 is configured to only allow a reverse-V-shaped bending of the board members. Namely, an upper skin 27b on the lower side is provided to extend continuously over the board members 13, 14, while an upper skin 27a on the upper side is cut out at the joint portion. And, both tip ends of the board members 13, 14 are located so as to contact each other in a state where they are not bent.

Figure 3:
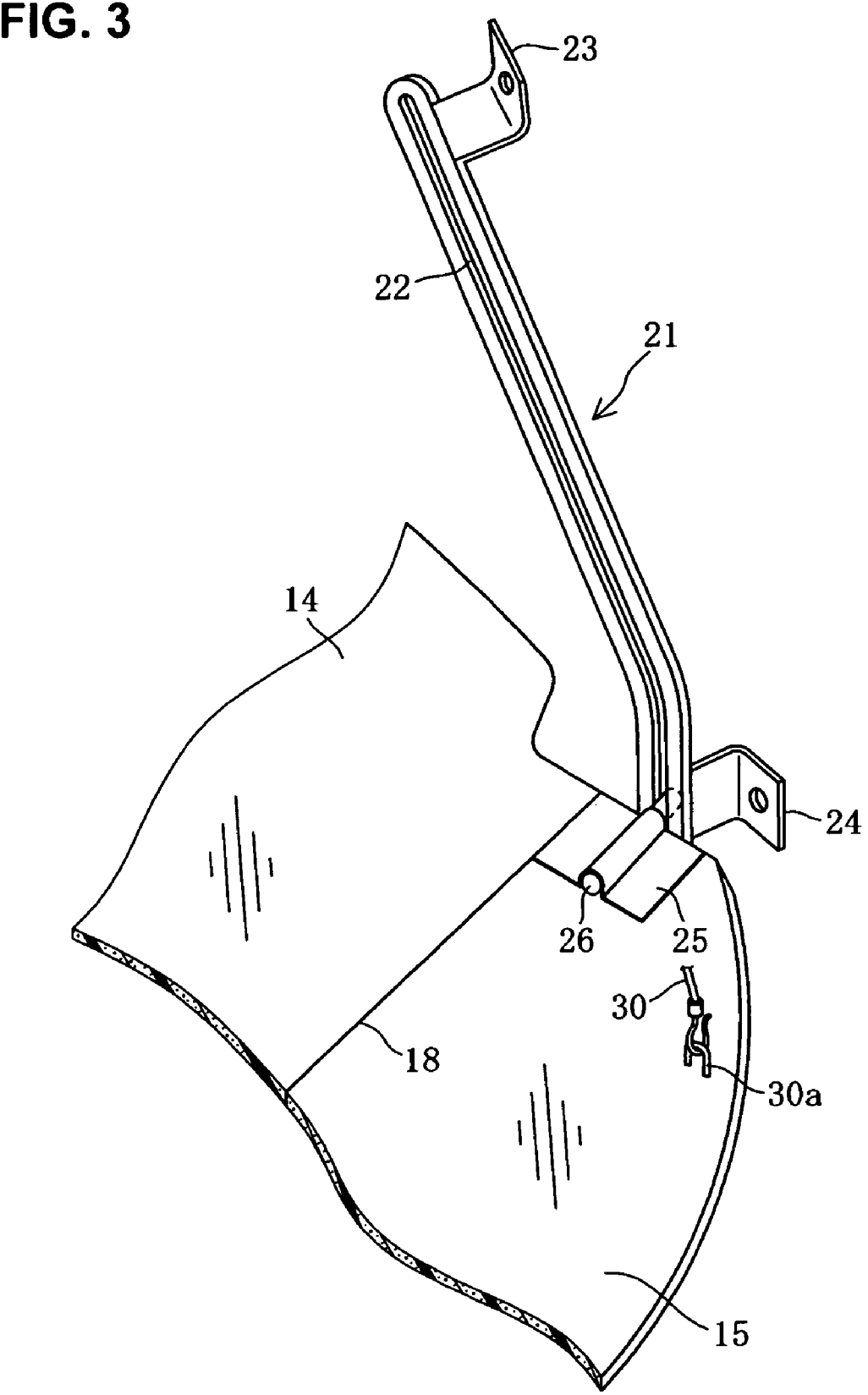
FIG. 3 is a perspective view of a tonneau cover and a guide rail.

As shown in FIGS. 1 and 3, the guide rail 21 comprises a guide groove 22 that is made of a steel plate and extends substantially straightly. Its rear (lower) end is gradually bent downward. The guide rail 21 includes L-shaped attaching portions 23, 24 at its upper and lower ends, respectively. A pair of guide rails 21 is provided at both-side rear pillars 7 that is located before the rear opening 2 via the attaching portions 23, 24 so as to extend obliquely (with about a 40-degree slant with respect to a horizontal face). The both guide rails 21 are provided in parallel and symmetrically. A distance between the guide rails 21 is set to be substantially identical to the width of the board member 15 in a vehicle width direction.

The rear board member 15 has attaching pieces 25 at its both side upper faces, and a pin 26 is provided in each attaching piece 25. A tip of each pin 26 is located in the guide groove 22 of the guide rail 21 so as to be guided in the groove. Thus, the board member 15 is supported at the both-side guide rails 21 so as to move vertically. Herein, the pin 26 is configured to be detachable from the guide groove 22 (herein, the pin 26 is configured to project and retract laterally with respect to the attaching piece 25 and lock its position at respective states, thereby attaching the board 15 detachably to the guide groove 22). Thereby, the tonneau cover 11 is configured to be detachable from the guide rails 21 and foldable on its front board member 12 located behind the storage case 19.

A lower end of the belt member 30 is detachably attached to a connecting metal piece 30a that is provided at a portion of the board member 15 behind the attaching piece 25. An upper of the belt member 30 is coupled to an connecting portion 30b that is provided at an upper portion of the back door 3. Thus, the belt member 30 associates the board member 15 with the back door 3 so that the rear-side board members 14, 15 can move vertically with substantially horizontal positions according to the open-close operation of the back door 3.

When the back door 3 opens, the board member 15 moves upward with substantially its horizontal position along the guide rails 12 by being pulled by the belt member 30. And, the tonneau cover 11 is configured to be bent at the joint connections 16, 17, as shown in FIG. 1, in order to absorb a change of a longitudinal distance between the pin 26 at the support point of the board member 15 at the guide rail 21 and the pivot axis portion 20 of the front board member 12.

As shown by a three-dotted broken line in FIG. 1, when the board member 15 has moved up to its upper position, the board members 12, 13 are bent at the joint connection 16 in a V shape, the board members 13, 14 are bent at the joint connection 17 in a reverse V shape, and the board members 14, 15 are located substantially horizontally. Accordingly, the tonneau cover 11 is opened widely to provide a wide opening over the baggage compartment 4, and therefore it can be easy to carry in or out any baggage from the baggage compartment 4.

When the back door 3 is closed, the board members 14, 15 may be lowered along the guide rails 21 by their weights, and the board members 12, 13 may also go down accordingly. When the board member 15 is located in its lowered position, as shown by a solid line in FIG. 1, the tonneau cover 11 extends horizontally so as to close the baggage compartment 4 and cover over the baggage. In a case where any loaded baggage is located above the above horizontal position of the toneau cover 11, the tonneau cover 11 stops its lowering when it contacts this baggage.

Figure 9:
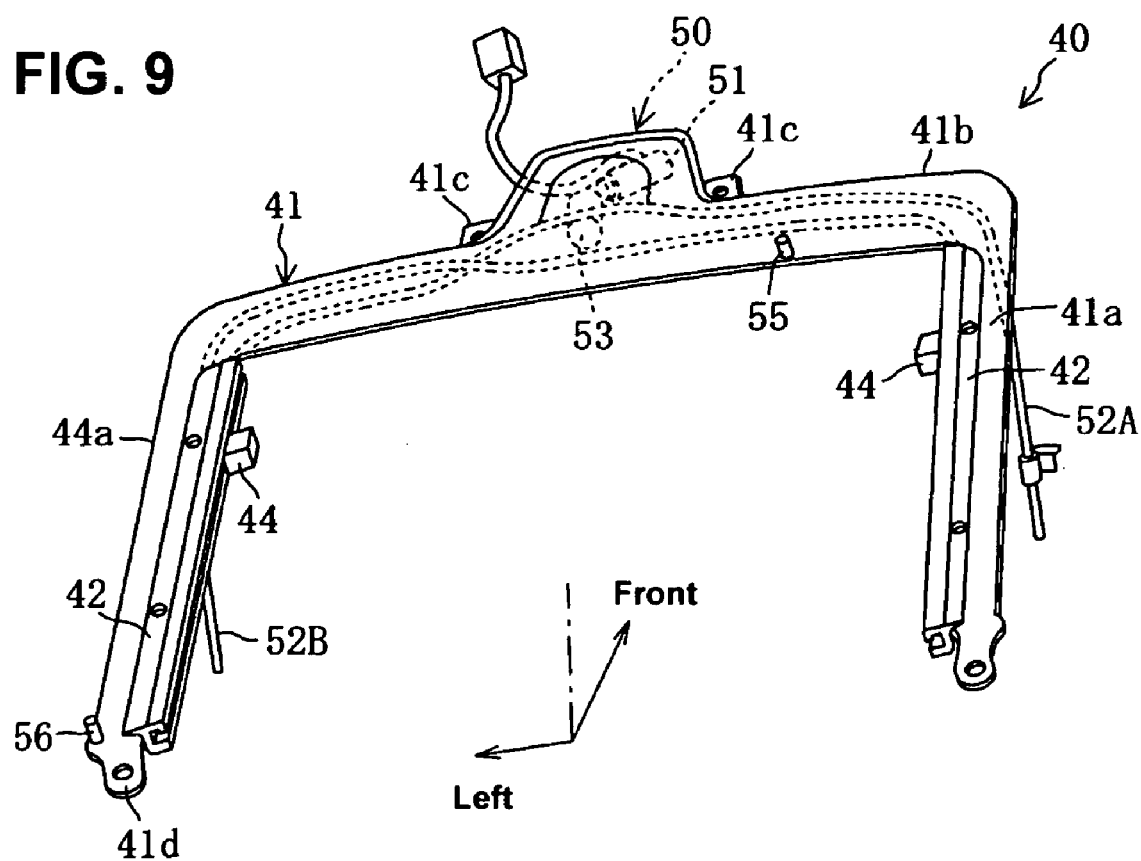
FIG. 9 is a perspective view of an electric board member open-close mechanism.

Herein, although the pin 26 is configured to be detachable from the guide groove 22 in the above-described embodiment, there may be provided a carriage 44 that is provided to be movable along the guide groove 22 as shown in FIG. 9, and this pin 26 may be held detachably at the carriage 44. In this case, although the carriage may be lowered by its weight if the pin 26 is removed when the carriage 44 is located at an upper end of the guide groove 22, the carriage 44 can be positioned at this upper end of the guide groove 22 all the time while the back door 3 is in the open state by connecting the lower end of the belt member 30 with the carriage 44.

Hereinafter, the operation and effect of the tonneau cover device 10 will be described. According to the opening of the back door 3, the board member 15 is pulled up by the belt member 30 and moves obliquely forward and upward, and the board member 14 also moves upward together. Then, as shown by a one-dotted broken line and a two-dotted broken line in FIG. 1, the joint connection 16 between the board members 12, 13 is bent in the V shape, the joint connection 17 between the board members 13, 14 is bent in the reverse V shape, and thereby the front portion of the tonneau cover 11 is bent. Thus, the change of the longitudinal distance between the pin 26 at the support point of the board member 15 at the guide rail 21 and the pivot axis portion 20 of the front board member 12 can be absorbed. When the board member 15 has moved up to its upper position, as shown by the three-dotted broken line in FIG. 1, the joint connections 16, 17 are bent greatly, and the board members 14, 15 are located substantially horizontally. Accordingly, the tonneau cover 11 is opened widely.

As described above, since the change of the longitudinal distance between the pin 26 at the support point of the board member 15 at the guide rail 21 and the pivot axis portion 20 of the front board member 12 when the tonneau cover 11 moves upward is absorbed, the board member 14 can move upward to the same position of the board member 15 and the wide opening can be provided over the baggage compartment 4. Thereby, the tonneau cover 11 can allow even large baggage or the like to be carried in or out of the baggage compartment 4 of the vehicle smoothly.

Since a pair of guide rails 21 to guide the rear portion of the tonneau cover 11 is provided, the vertical movement of the board member 14, 15 is properly guided and thereby the bending moment of the board members 12, 13 is properly guided. Accordingly, the stable and reliable operation of the tonneau cover 11 can be attained. And, since there is provided the belt member 30 to move the board member 15 vertically according to the open-close operation of the back door 3, the tonneau cover 11 can be opened or closed automatically according to the open-close operation of the back door 3.

Since the tonneau cover 11 comprises the four board members 12-15 and the joint connections 16-18 of the four board members 12-15 are configured such that the center joint connection 17 can only allow the reverse-V-shaped bending and the front and rear joint connections 16, 18 can only allow the V-shaped bending of the board members, the tonneau cover 11 can be bent properly according to the upward movement of the board member 15.

Since the board members 14, 15 are located substantially horizontally when the board member 15 moves to its upper position, a better appearance can be provided when the tonneau cover 11 is opened. And, since the tonneau cover 11 is detachable from the guide rails 21 and foldable, the tonneau cover 11 can be folded and stored properly when it is not used. Also, the board members 12-15 have substantially the identical longitudinal length respectively, the tonneau cover 11 can be stored compactly with the substantially same length folded-board members 12-15.

Hereinafter, some partially modified embodiments will be described.

1) In the above-described embodiment, the belt member 30 may be connected to the board member 14, instead of the board member 15, so that the board member 14 can move vertically directly according to the opening of the back door 3.

Figure 7:
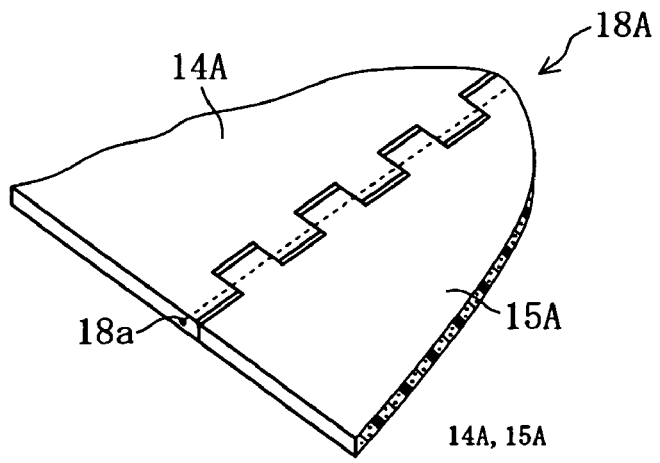
FIG. 7 is a perspective view of a joint connection of board members of a modified embodiment.
Figure 8:
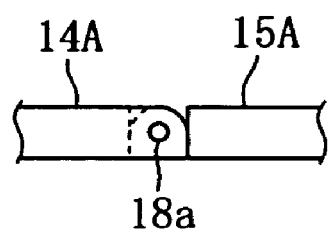
FIG. 8 is a side view of the joint connection of FIG. 7.

2) Board members that are made of plate members that are made of synthetic resin may be applied in place of the above-described board members 12-15. For example, as shown in FIGS. 7 and 8, a joint connection 18A of board members 14A, 15A comprises plural projections that are formed at an end of the board member 14A, plural projections that are formed at an end of the board member 15A, and an axis member 18a that gets through and pivotally connects these plural projections of the members 14A, 15A thereby. And, a R-shaped edge portion is formed only at an upper face of each tip end of the projections of the members 14A, 15A, so that the joint connection 18A can only allow the V-shaped bending of the board members 14A, 15A. Herein, a reverse (up side down) structure is applied to the joint connection that can only allow the reverse-V-shaped bending of board members.

3) An electric board member open-close mechanism 40, shown in FIG. 9, may be applied in place of the guide rails 21 and belt members 30 of the above-described embodiment. Herein, FIG. 9 is a perspective view of the board member open-close mechanism 40, when viewed from the vehicle body side. This board member open-close mechanism 40 comprises a frame 41 including a pair of guide rails 42, an electric-operated mechanism 50, two push-pull cables 52A, 52B that are driven by the electric-operated mechanism 50, and so on.

The frame 41 comprises two leg portions 41a extending vertically and connection portion 41b interconnecting upper ends of the leg portions 41a, and at inner portions of the leg portions 41a are provided straight guide rails 42 with guide grooves 43. To the guide rails 42 is movably attached a pair of carriages 44 that are connected to both-side members of the board member 15 for moving the board member 15 vertically. The electric-operated mechanism 50 is provided at the connection portion 41b, and this mechanism 50 is operated by an operation switch that is provided in the vehicle cabin (not illustrated).

The electric-operated mechanism 50 comprises a drive motor 51, and a cable reel 53 that is driven by the motor 51 via a worm-gear reduction mechanism. The push-pull cable 52A, which is to drive the left-side carriage 44, is connected to the carriage 44 at its tip; goes through an outer tube and to the cable reel 53, and then extends to the right and finally ends.

The push-pull cable 52A includes two outer tubes. A left end of the left-side outer tube is fixed to an upper end of the guide rail 42 and a right end thereof is fixed to a reel case of the cable reel 53. A left end of the right-side outer tube is fixed to the reel case and a right end thereof is fixed to an inner face of the right-side rear pillar. The push-pull cable 52B is to drive the right-side carriage 44 and has substantially symmetrical structure with respect to the push-pull cable 52A, whose discretions are omitted here.

A positioning pin 56 for positing to the rear pillar 7 when the board member open-close mechanism 40 is attached to the vehicle rear portion is provided at a lower end portion of the left-side leg portion 41a. At the connection portion 41b is provided a positioning pin 55 for positing to a rear header. Herein, when the board member open-close mechanism 40 is attached to the vehicle rear portion inside the vehicle, positioning to the rear header and the rear pillar 7 with these pins 55, 56 is conducted, and then a pair of attaching portions 41c provided at a center of the connection portion 41b is attached to the rear header and attaching portions 41d are attached to the rear pillars 7.

According to the electric board member open-close mechanism 40 comprising the frame 41 including the guide rails 42 and the electric-operated mechanism 50 operative to move the board member 15 vertically, the tonneau cover 11 can be opened or closed easily by switching operation. Herein, the electric-operated mechanism 50 may be driven according to the opening-closing operation of the back door 3, so the board member 15 can be moved vertically by this mechanism 50.

4) In the above-described embodiment, at least one of the above-described joint connections 16, 17 may be configured to allow both the reverse-V-shaped bending and the V-shaped bending and the board members 12, 13, 14 may be configured to keep their horizontal position at their lowered position by being supported by a pair of support members that is provided so as to project inward from the both-side inner portion of the vehicle rear body.

5) The both-side ends of the rear board member 15 of the tonneau cover 11 may be supported movably at the guide rails 21 via support members 60 that allows the rear board member 15 to move longitudinally relative to the guide rails 21 by a specified length. Hereinafter, this structure will be described specifically referring to FIGS. 10 through 14.

The support member 60 comprises a main body portion 60a that is formed in block shape with a sufficient rigidity, and a long-plate shaped slide portion 61 is integrally formed at an outside of the main body portion 60a. The slide portion 61 is guided at the guide rail 21 so that the slide portion 61 can only move in a longitudinal direction of the guide rail 21 (without rotating movement). The guide rail 21 has an open end at its upper tip so that the slide portion 61 can be applied (inserted) into the guide rail 21 from this open end.

A guide groove 62 as a horizontal-maintaining portion is formed at the main body portion 60a of the support member 60. Although the guide groove 62 is formed to have a through hole laterally (in the vehicle width direction) in the present embodiment, it may be formed so that the hole is closed at its outside (having an opening only at its inside). The guide groove 62 is provided so as to be located inward with respect to the slide portion 61.

An engagement portion 70, which is formed at both-side ends of the board member 15, is engaged with the guide groove 62. This engagement portion 70 is configured to have a longitudinal length that is shorter than that of the guide groove 62 and upper and lower face that are in parallel. In a state where the engagement portion 70 is engaged with the guide groove 62, the engagement portion 70 is guided in the guide groove 62 to move longitudinally without shaking (without rotating movement). The engagement portion 70 is provided at tip ends of a bar member 71 that extends in the vehicle width direction (laterally). The bar member 71 is fixed to a front end portion of the board member 15 with adhesion, screw or the like. The engagement portion 70 is located at a front side in the guide groove 62 so that there exists a specified distance L1 between the engagement portion 70 and a rear-end face of the guide groove 62 as shown in FIGS. 11 through 14.

The reason for providing the specified distance L1 will be described referring to FIG. 10. In a state where the board members 12-15 are positioned substantially horizontally in the lowered position, when the rear board member 15 moves forward, it may press forward the front-located board member 14 with its front end face due to this horizontally adjacent disposition of these board members 14, 15. Thus, the forward movement of the rear board member 15 is restricted (the foremost board member 12 is prevented from moving forward). Namely, when the rear board member 15 is guided upward by the guide rails 21 from the lowered position, it moves not only upward but forward. However, the forward movement of the rear board member 15 is restricted by the above-described pressing of the front-located board member 14, so that the smooth movement of the rear board member 15 could not be provided. A state where a rear end of the board member 14 is raised slightly is shown by a one-dotted broken line in FIG. 10. Herein, if the rear board, member 15 presses this board member 14 forward, the joint connection 18 is bent easily in the V shape, which can allow a smooth subsequent upward movement of the board member 15 with the forward movement.

Figure 10:
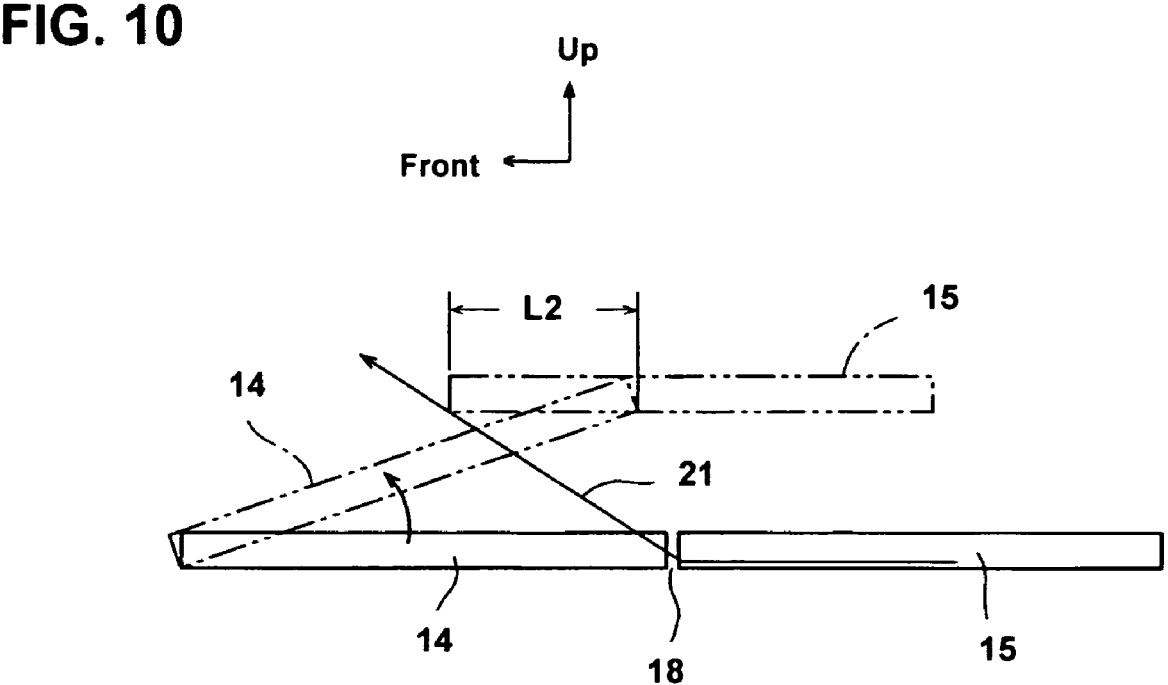
FIG. 10 is an explanatory diagram of an interference between adjacent board members and a longitudinal distance for preventing the interference.
Figure 11:
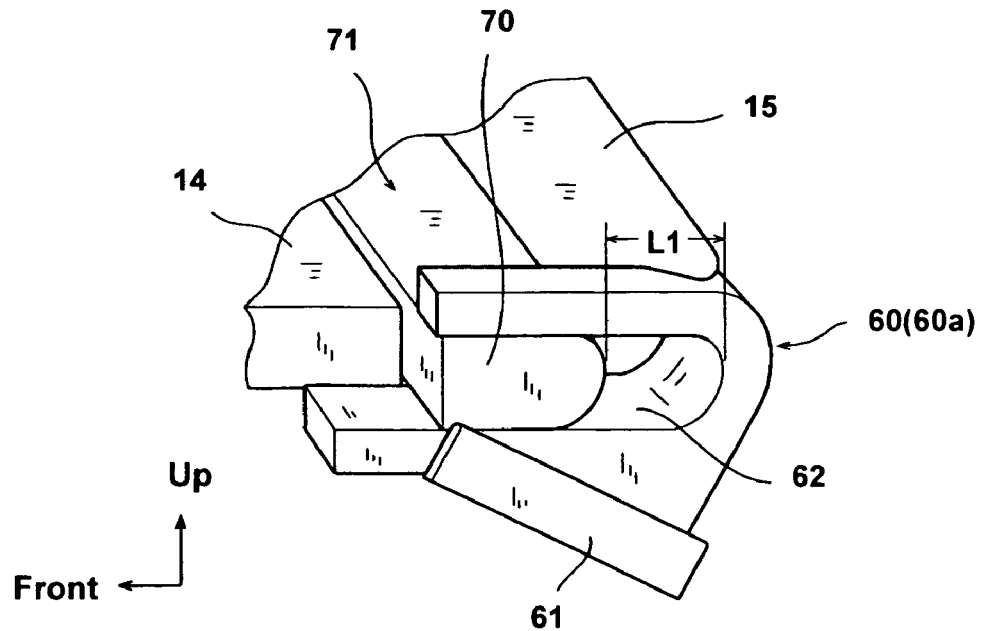
FIG. 11 is a perspective view of a major portion showing a relationship between a guide groove provided at a support member and an engagement portion according to a modified embodiment.
Figure 12:
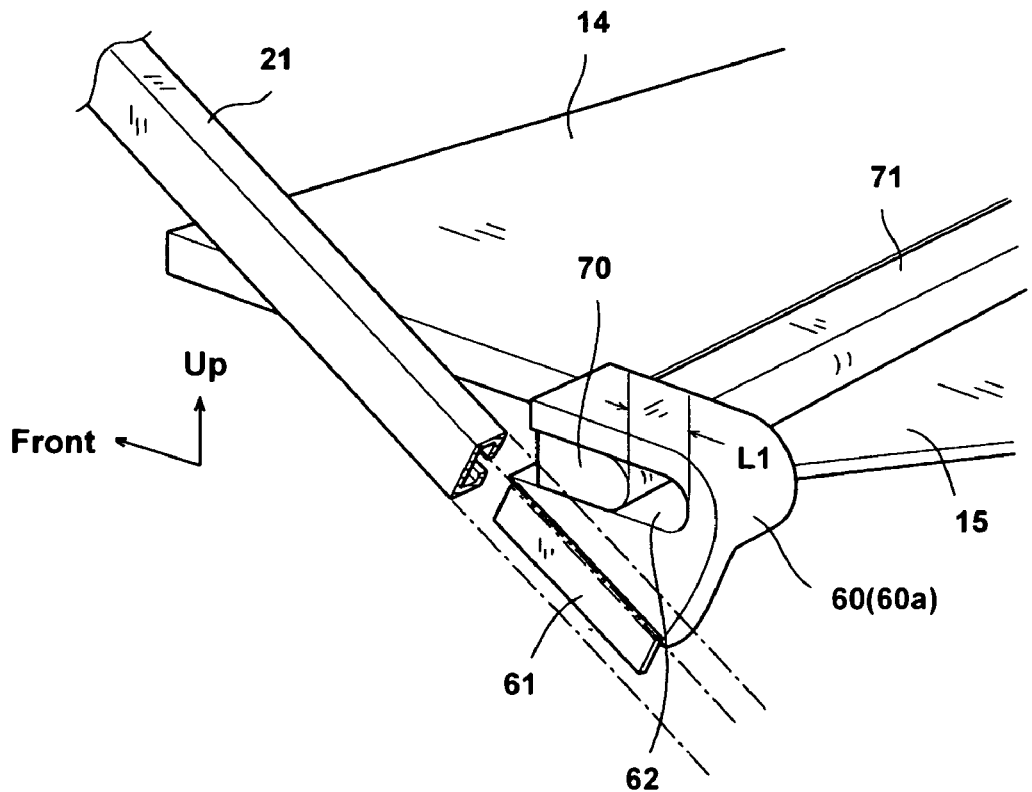
FIG. 12 is a perspective view of the major portion showing a structure around the support member.
Figure 13:
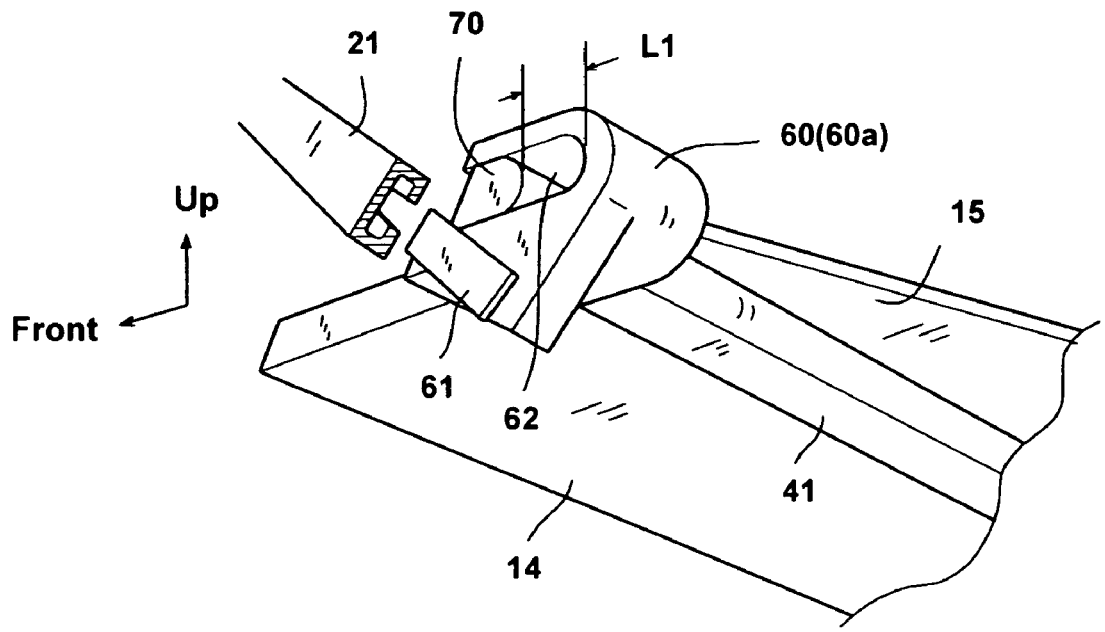
FIG. 13 is a perspective view of the major portion showing the structure around the support member.
Figure 14:
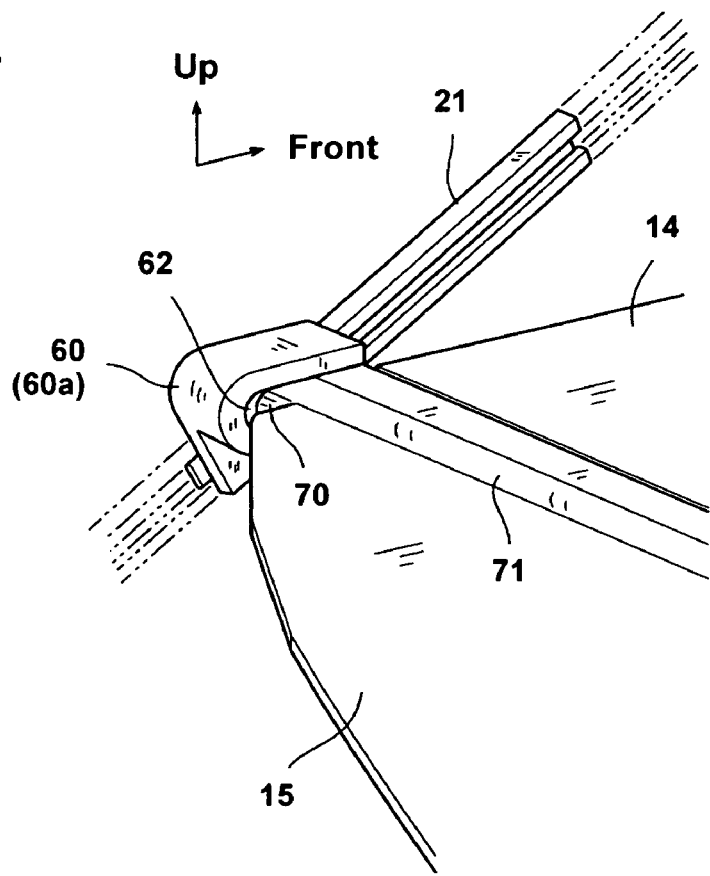
FIG. 14 is a perspective view of the major portion showing the structure around the support member.

When the front board member 14 is in the position shown by the one-dotted broken line in FIG. 10, the rear board member 15 shown by a one-dotted broken line herein just shows a position where it would be simply displaced along the guide rails 21. Herein, an interference between the both board members that relates to the above-described restriction caused by the pressing is shown by a distance denoted by L2. The distance L2 is set to be about equal to the above-described specified distance L1 between the engagement portion 70 and the rear-end face of the guide groove 62 (it may be necessary that the distance L1 is equal to the distance L2 or longer). Namely, the interface between the board members 14, 15 shown by the distance L2 in FIG. 10 can be prevented by this properly setting of the distance L1.

Figure 15:
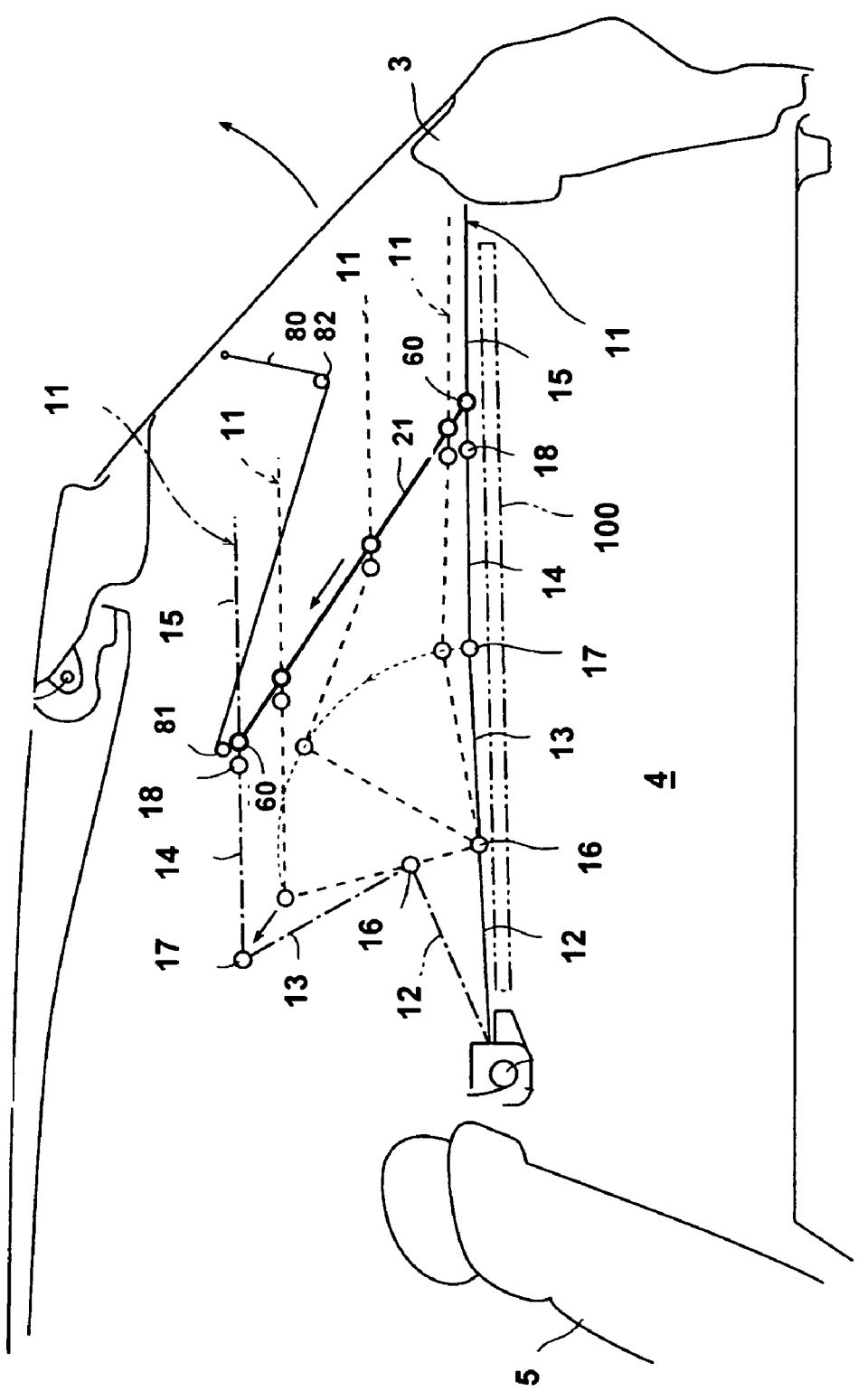
FIG. 15 is a schematic side view of a vehicle rear portion of another modified embodiment.

6) In the above-described embodiment, the belt member 30 as the association mechanism to move the rear board member 15 vertically according to the open-close operation of the back door 3 is provided so as to connect the back door 3 with the board member 15 straightly. However, this mechanism may be formed by another type of linkage mechanism, which will be described referring to FIG. 15. Namely, the back door 3 and the above-described support member 60 is connected by a belt-shaped connecting member 80. This connecting member 80 may be formed of a flexible wire that is made of steel or synthetic resin, or the like. And, for guiding the connecting member 80, a first pulley 81 as a first guide potion and a second pulley 82 as a second guide portion are provided. The first pulley 81 is attached to a specified portion of the vehicle body that is located near an upper end of the guide rail 21 and on an extension line of the guide rail 21. The second pulley 82 is attached to a specified portion of the vehicle that is located in back of the first pulley 81 and near the closed back door 3. One end of the connecting member 80 is connected to the support member 60 (main body portion 60a), getting through in the guide rail 21, and the other end of the connecting member 80 is connected to a side portion of the back door 3, passing by the two pulleys 81, 82, so that the connecting member 80 can be guided by the pulleys 81, 82. Herein, a member shown by a reference numeral 100 in FIG. 15 is a roll-type partition sheet 100 that is operative to cover over the baggage compartment 4 behind the rear seat 5.

7) The above-described embodiments show a type of the tonneau cover device in which all of the boards including the foremost-located board are movable. However, another type in which the foremost-located board is fixed to the vehicle body all the time and other boards located behind this fixed foremost-located board are movable may be applied. In this case, the tonneau cover defined in the claim 1 of the present invention means a tonneau cover that comprises these movable boards excluding the fixed foremost-located board.

The present invention should not be limited to the above-described embodiments and modifications. Any other modifications and improvements can be applied within the scope of a sprit of the present invention.

What is claimed is:

1. A tonneau cover device, comprising:
   a tonneau cover provided behind a seat back of a vehicle, the tonneau cover being configured to cover over a baggage compartment formed before a rear opening that is opened and closed by a back door that is operated vertically; and
   a pair of guide rails provided at both-side rear pillars of the vehicle that is located before the rear opening, the guide rails being configured to support both-side rear ends of the tonneau cover movably in substantially an obliquely direction along the rear pillars, wherein a front end portion of said tonneau cover is pivotally supported at the vehicle, the tonneau cover comprises a plurality of board members that are provided in a longitudinal direction of the vehicle and jointly connected to each other, a rear board member of the tonneau cover is supported by said guide rails so as to move substantially vertically along the guide rails, and a change of a longitudinal distance between a support point of said rear board member at the guide rail and a pivot axis portion of said front end of the tonneau cover at the vehicle when said rear board member moves upward along the guide rails is configured to be absorbed by said joint connection of the board members.

2. The tonneau cover device of claim 1, wherein said tonneau cover comprises at least four board members, and said joint connections of the four board members are configured such that a center joint connection can only allow a reverse-V-shaped bending of the board members and front and rear joint connections can only allow a V-shaped bending of the board members.

3. The tonneau cover device of claim 1, wherein said rear board member of the tonneau cover is configured to be located substantially horizontally when the rear board member moves to an upper position thereof.

4. The tonneau cover device of claim 1, wherein said tonneau cover is configured to be detachable from said guide rails and foldable.

5. The tonneau cover device of claim 4, wherein said plural board members of the tonneau cover have substantially an identical longitudinal length, respectively.

6. The tonneau cover device of claim 1, wherein there is provided an association mechanism to move said rear board member of the tonneau cover vertically according to an open-close operation of said back door.

7. The tonneau cover device of claim 1, wherein there is provided an electric board member open-close mechanism that comprises a frame including said guide rails and an electric-operated mechanism operative to move said rear board member of the tonneau cover vertically.

8. The tonneau cover device of claim 1, wherein both-side ends of said rear board member of the tonneau cover are supported movably at said guide rails via support members so that the rear board member moves upward along the guide rails, and the support members are configured so as to allow the rear board member to move longitudinally relative to the guide rails by a specified length.

9. The tonneau cover device of claim 8, wherein said support member comprises a horizontal-maintaining portion operative to maintain the rear board member substantially horizontally, the rear board member comprises an engagement portion at each of the both-side ends thereof, and the engagement portion is engaged with said horizontal-maintaining portion so that the rear board member can be maintained substantially horizontally.

10. The tonneau cover device of claim 9, wherein said engagement portion is provided at a tip end of a bar member that extends in a vehicle width direction between the both-side guide rails.

11. The tonneau cover device of claim 9, wherein said engagement portion is engaged so as to be detachable from said horizontal-maintaining portion.

12. The tonneau cover device of claim 8, wherein there is provided a linkage device that connects the rear board member to the back door so as to move the rear board member of the tonneau cover vertically according to an open-close operation of the back door, and the linkage device comprises a first guide portion provided at the vehicle near an upper end portion of the guide rail, a second guide portion provided at the vehicle in back of the first guide portion, and a belt-shaped connecting member connecting said support member and the back door, the connecting member being disposed so as to be guided by the first and second guide portion.

13. The tonneau cover device of claim 8, wherein said support member comprises a guide groove that extends substantially longitudinally and horizontally, an engagement portion provided at each of the both-side ends of the rear board member is disposed in the guide groove so as to move longitudinally in the guide groove, the rear board member is maintained substantially horizontally with the engagement portion being disposed in the guide groove, and a longitudinal relative position of the engagement portion in the guide groove when the rear board member is lowered is located before that of the engagement portion when the rear board member moves to an upper position thereof.

14. The tonneau cover device of claim 13, wherein said guide groove has an open end at a front thereof, and the rear board member is configured to be detachable from the support member when the engagement portion goes out of the open end of the guide groove.

15. The tonneau cover device of claim 13, wherein said support member comprises a slider that is guided by the guide rail, the slider being fixed to the support member outward the guide groove so as not to rotate relatively to the support member.

16. A tonneau cover device, comprising:

a tonneau cover provided behind a seat back of a vehicle, the tonneau cover being configured to cover over a baggage compartment formed before a rear opening that is opened and closed by a back door that is operated vertically; and a pair of guide rails provided at both-side rear pillars of the vehicle that is located before the rear opening, the guide rails being configured to support both-side rear ends of the tonneau cover movably in substantially an obliquely direction along the rear pillars, wherein a front end portion of said tonneau cover is pivotally supported at the vehicle, the tonneau cover comprises a plurality of board members that are provided in a longitudinal direction of the vehicle and jointly connected to each other, a rear board member of the tonneau cover is supported by said guide rails so as to move substantially vertically along the guide rails, a change of a longitudinal distance between a support point of said rear board member at the guide rail and a pivot axis portion of said front end of the tonneau cover at the vehicle when said rear board member moves upward along the guide rails is configured to be absorbed by said joint connection of the board members, the rear board member of the tonneau cover is configured to be located substantially horizontally when the rear board member moves to an upper position thereof, and the tonneau cover is configured to be detachable from the guide rails and foldable.

17. A tonneau cover device, comprising:

a tonneau cover provided behind a seat back of a vehicle, the tonneau cover being configured to cover over a baggage compartment formed before a rear opening that is opened and closed by a back door that is operated vertically; and a pair of guide rails provided at both-side rear pillars of the vehicle that is located before the rear opening, the guide rails being configured to support both-side rear ends of the tonneau cover movably in substantially an obliquely direction along the rear pillars, wherein a front end portion of said tonneau cover is pivotally supported at the vehicle, the tonneau cover comprises a plurality of board members that are provided in a longitudinal direction of the vehicle and jointly connected to each other, a rear board member of the tonneau cover is supported by said guide rails so as to move substantially vertically along the guide rails, a change of a longitudinal distance between a support point of said rear board member at the guide rail and a pivot axis portion of said front end of the tonneau cover at the vehicle when said rear board member moves upward along the guide rails is configured to be absorbed by said joint connection of the board members, there is provided an association mechanism to move the rear board member of the tonneau cover vertically according to an open-close operation of the back door, and the tonneau cover is configured to be detachable from the guide rails and foldable.

* * * * *

UNITED STATES PATENT AND TRADEMARK OFFICE
CERTIFICATE OF CORRECTION

PATENT NO. : 7,641,256 B2  Page 1 of 1
APPLICATION NO. : 11/636664
DATED : January 5, 2010
INVENTOR(S) : Kodaira et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 416 days.

Signed and Sealed this

Sixteenth Day of November, 2010

David J. Kappos
*Director of the United States Patent and Trademark Office*